United States Patent [19]

Sutherland et al.

[11] 4,379,294

[45] Apr. 5, 1983

[54] DATA HIGHWAY ACCESS CONTROL SYSTEM

[75] Inventors: James F. Sutherland, Limerick, Ireland; Donald F. Furgerson, Murrysville, Pa.; Mladen Kezunović, Sarajevo, Yugoslavia

[73] Assignee: Electric Power Research Institute, Inc., Palo Alto, Calif.

[21] Appl. No.: 234,060

[22] Filed: Feb. 12, 1981

[51] Int. Cl.³ ............................................. H04Q 9/00
[52] U.S. Cl. .................................. 340/825.5; 370/85; 178/3
[58] Field of Search .......... 370/85; 340/825.5, 825.57; 178/3

[56] References Cited

U.S. PATENT DOCUMENTS 4,161,786  7/1979  Hopkins et al. ..................... 370/85
4,210,780  7/1980  Hopkins et al. ..................... 370/85

Primary Examiner—Donald J. Yusko
Attorney, Agent, or Firm—W. E. Zitelli

[57] ABSTRACT

An arrangement for permitting communication among a plurality of stations on a single serial data communications bus. Each station is provided a choice between two modes of operation. All stations ordinarily operate in a normal mode, seeking access to the serial bus upon occurrence of a democratic time window. In the normal mode, each station is given an opportunity to issue a single transmission before any one station is permitted to issue a second transmission. Should any station require transmission of an urgent message, that station may seek access during an autocratic time window. Within any single round of bus arbitration, all autocratic time windows occur prior to the first democratic time window.

3 Claims, 4 Drawing Figures

DATA HIGHWAY ACCESS CONTROL SYSTEM

CROSS-REFERENCES TO RELATED APPLICATIONS

This application is related to the following applications filed concurrently herewith:

Ser. No. 210,700 filed Nov. 26, 1980 entitled "A Bus Access Circuit for High-Speed Digital Data Communications" by C. W. Einolf, Jr., I. A. Szabo, and A. W. Crew.

BACKGROUND OF THE INVENTION

The present invention relates to data communication systems, and more particularly to an arrangement for permitting a plurality of processor units in a communications network to communicate among one another on a single serial bus.

In one common type of communications network, a number of processor units are connected to a single serial data communications bus which comprises any one or a plurality of transmitting media, such as coaxial cable, optical fiber, or others. The processor units connected to the serial bus will hereinafter be designated as stations.

Any particular station may comprise a variety of hardware elements and may be dedicated to various purposes. For example, a single network may comprise stations dedicated to a specific control or monitor task, stations dedicated to data accumulation or analysis, and stations dedicated to peripheral equipment for user input and output. Each station has in common a transmitter-receiver unit which enables the station to communicate with any of the other stations connected to the serial bus.

An important characteristic of this typical communication network is that no dedicated station is provided for controlling the serial bus communications. As a result, communications in this network are not crippled by the failure of a single station. There remains, however, the problem of arbitrating orderly access to the single serial bus among the plurality of connected stations.

Copending application, Ser. No. 210,700, is addressed to the problem of arbitrating orderly access to the serial bus and presents an improved bus access arrangement. In this arrangement, each station in the network is provided a discrete time window during which it may initiate transmission on the single serial bus. If access is not claimed within the station's time window, the station is prevented from issuing the transmission until its time window reappears during the next round of bus arbitration. In this arrangement, each station is given a single opportunity to issue a transmission before any one station has the opportunity to make a second transmission. This is termed a democratic access arrangement. This prior art scheme operates efficiently to prevent domination of the serial bus by a few stations with high priority by allowing each station the opportunity to transmit within a reasonable period of time. Problems may arise, however, where stations in the network sometimes require immediate access to the serial bus to transmit an emergency message.

In the practical application of a communications network, the need sometimes arises for a network station to communicate immediately with one or more other stations within that network. Where such a network comprises a relatively large number of stations, the prior art scheme revealed by the aforestated copending application may be unable to provide access to the serial bus quickly enough to accommodate the emergency message. Such would be the case where a station needing to issue an emergency transmission must await the completion of transmissions by a number of stations concurrently awaiting channel access for possibly less urgent transmissions.

Hence, it would be advantageous to develop a bus access arrangement which, in addition to providing for orderly and collision-free access by a plurality of stations, also permits relatively quick access to the bus by any station in the network for transmission of an emergency message.

SUMMARY OF THE INVENTION

In a digital communications system, a serial data communication network comprises a plurality of stations interfaced to a common serial data communications bus through which each of the stations communicates to every other of the stations, and a plurality of circuit means, each in communication with one of the stations for controlling orderly and collision-free access by the station to the serial bus and each operative in a selected one of the modes including a normal transmission mode and an emergency transmission mode.

Each circuit means comprises: a first means for monitoring the bus for transmission inactivity over a preassigned first time period which is substantially common to all of the stations of the plurality, and a second means for monitoring the bus for transmission inactivity over a selected one of preassigned second and third time periods. The first means includes means for reinitializing its monitoring time upon protection of bus transmission activity within the first time period and for repeating monitoring of the bus over another first time period upon detection of transmission inactivity throughout the first time period. Means are further provided for generating a first signal upon initiation of each repeat of a monitoring operation.

Each circuit means corresponding to a station of the plurality is preassigned a unique set of second and third time periods, all the preassigned second time periods being shorter in time than the shortest of the preassigned third time periods, and the preassigned first time period being longer in time than the longest of the preassigned third time periods.

The second means includes means for reinitializing its monitoring time upon detection of bus transmission activity within the selected time period and for generating a second signal upon detection of transmission inactivity throughout the selected time period. The second means further includes means for repeating monitoring the bus over another selected time period concurrent with the repeat of monitoring operation of the first means. The preassigned second and third time periods are selected corresponding to the desired transmission mode of the normal and emergency transmission modes of the corresponding station, respectively.

Also provided is a means governed by the second signal to conditionally generate a third signal to permit the corresponding station exclusive transmission access to the bus, whereby collision-free access by each corresponding station to the bus is achieved. The generating means is enabled to generate the third signal in accordance with the function based on a combination of time period selection and bus transmission activity, and on first signal generation; and is disabled to prevent generation of the third signal upon transmission activity of the corresponding station. The generating means remains disabled after the transmission by the corresponding station until enabled again, whereby an orderly and emergency access by each corresponding station to the bus is achieved.

DESCRIPTION OF THE PREFERRED EMBODIMENT

Figures 1, 2:
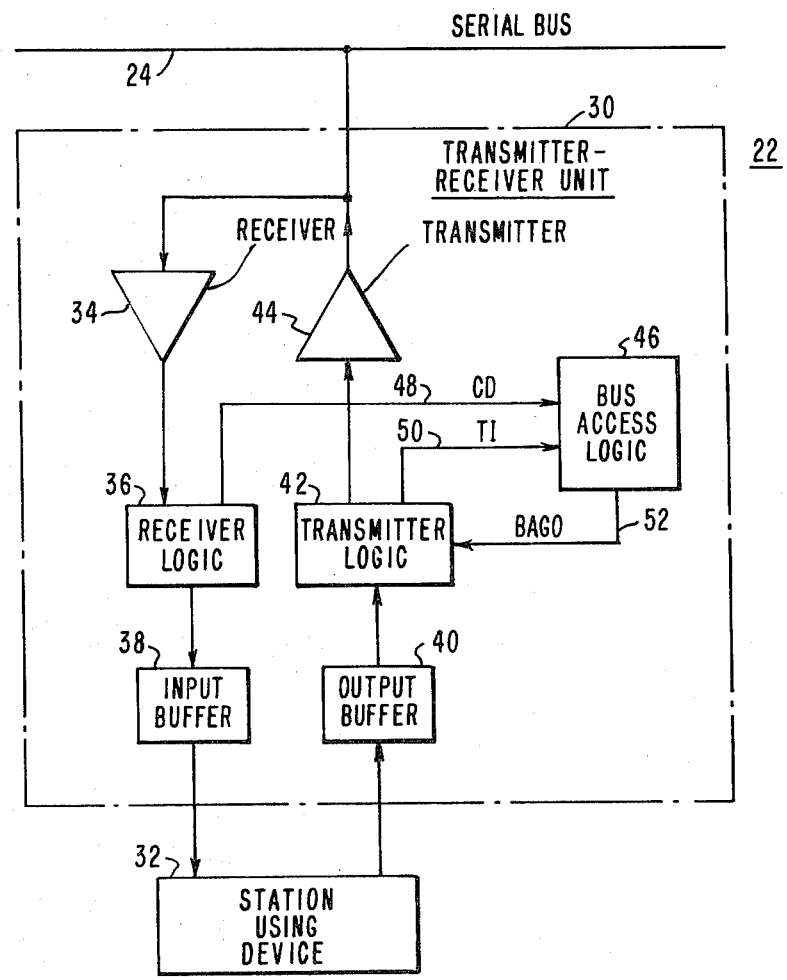
FIG. 1 is a block diagram showing a multistation communications network in which the invention is embodied.
FIG. 2 is a block diagram showing a transmitter-receiver unit in a station incorporating improved bus access logic.

FIG. 1 shows a block diagram of a communications network 20 which embodies the invention. Each station 22 of the network 20 is connected to a single serial bus 24. The invention is directed to coordinating the access of each station 22 to the serial bus 24 in such a way as to avoid transmission collisions and permit relatively rapid access by any station 22 for transmission of an emergency message.

As shown in FIG. 2, each station 22 of the network 20 in FIG. 1 comprises a transmitter-receiver unit 30 and a using device 32. The transmitter-receiver unit 30 functions as an interface between the serial bus 24 and the using device 32, which may comprise any of a variety of hardware elements.

In this arrangement, transmissions are removed from the serial bus 24 by a receiver 34 and passed to a receiver logic 36, where the message is decoded to ascertain its intended destination. If the transmission was directed to the receiving station 22, error checks are performed and the message is passed to the station using device 32 through an input buffer 38.

Messages originating in the station using device 32 are passed through an output buffer 40 to a transmitter logic 42. Here, the message is coded for transmission through a transmitter 44. A bus access logic 46 performs the service of defining when a transmission may be made.

In accordance with the principles of the invention, each station 22 in a serial data communications network 20 is provided an improved bus access logic 46 for cooperative operation with the bus access logic 46 of every other station 22 so as to enable relatively rapid access by the station 22 to the serial bus 24 for transmission of an emergency message thereon. The bus access logic 46 retains the advantages of orderly and collision-free access found in the prior art.

Alternative access for an emergency transmission is achieved by providing for each station 22 a choice between two discrete time windows during which bus access may be sought. A station 22 normally seeking bus access transmits during a democratic time window. If an emergency transmission is necessary, however, the station may opt for an autocratic time window which provides priority over the democratic time windows of all other stations.

The bus access logic 46 receives as an input 48 a carrier detect (CD) signal from the receiver logic 36 indicating that a transmission has been detected on the serial bus 24. The bus access logic 46 also receives as an input 50 a transmit indicate (TI) signal from the transmitter logic 42 indicating that a transmission is being issued on the serial bus 24. The bus access logic 46 provides as an output 52 a bus access go (BAGO) signal to the transmitter logic 42 indicating that a transmission may be initiated. If the transmitter logic is not prepared to release a transmission upon receiving the BAGO signal, the transmitter logic must withhold any subsequent transmission until the next assertion of the BAGO signal.

Figure 3:
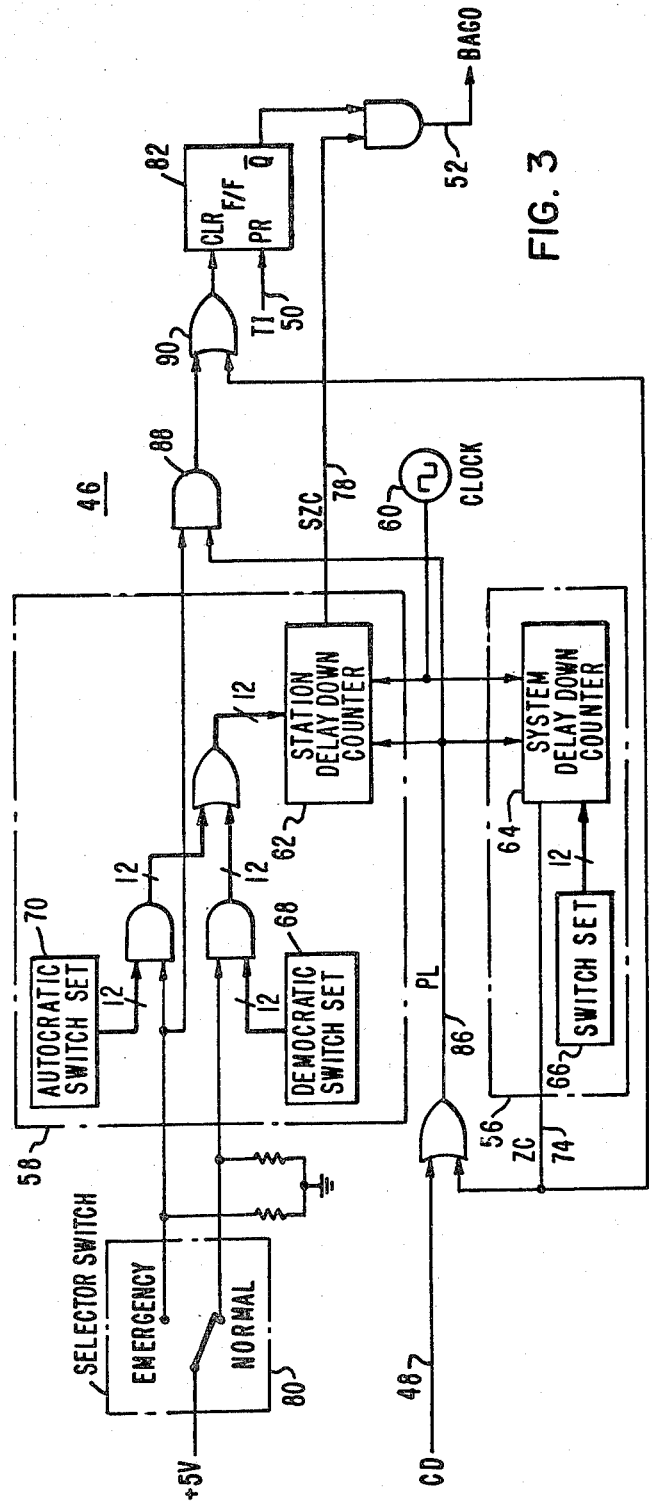
FIG. 3 is a block diagram depicting a schematic of the improved bus access logic as it interacts with the prior art bus access logic.

FIG. 3 shows a schematic block diagram of a circuit for an improved bus access logic 46. It should be noted that all hardware logic elements in this diagram, including AND gates, OR gates, counters and flip-flops, may be constructed from 7400 Series transistor-transistor logic by one skilled in the art. The logic 46 comprises two timers 56, 58 both of which are driven by the same bus access clock 60. The bus access clock may be any suitable crystal oscillator device, such as a Motorola K1100A crystal oscillator. Each timer 56, 58 comprises a down counter 62, 64 and means for preloading that down counter. A system delay down counter 64, comprising the system delay timer 56, is preloaded from a switch set 66. A station delay down counter 62, comprising the station delay timer 58, is preloaded from one of two switch sets 68, 70. A switch set 66, 68, 70 may be any suitable combination of switching elements such as dual in-line package switches. The two down counters 62, 64 are preloaded when the CD input 48 indicates the presence of a transmission on the serial bus 24, or when the system delay down counter 64 asserts a zero count (ZC) signal 74 indicating expiration of the system delay timer 56.

The bus access go (BAGO) signal 52 corresponds to a leading edge of a single clock pulse which indicates to the transmitter logic 42 within the transmitter receiver unit 30 (see FIG. 2) of the station 22 that a transmission may be initiated.

The bus access logic 46 depicted in FIG. 3 effectively allocates to each station 22 incorporating this logic 46 a discrete time window in which to claim access to the serial bus 24. The occurrence of this time window is governed by the station delay timer 58 and the system delay timer 56. When the CD signal 48 indicates that the serial bus 24 is silent, the station delay down counter 62 begins to count down from its preloaded state.

The magnitude of the preloaded state is different for the station delay down counter 62 of each station 22 in the network 20. The expiration of the station delay timer 58, marked by assertion of a zero count (SZC) signal 78, defines the time window for that station 22. The magnitude of the delay created by the station delay timer 58 is chosen so that each station 22 in the network 20 is allocated a discrete point in time at which it may initiate a transmission. The magnitude of all delays is physically determined by the position of individual switches comprising each switch set 66, 68, 70. After initiation of a transmission by any station 22 during its time window, the station delay timer 58 and the system delay timer 56 of each station 22 are reset when the CD signal 48 of that station 22 is asserted.

The system delay timer 56 defines the period of time required for each station 22 to detect that the station delay timers 58 of all stations in the network have expired without initiation of a transmission. Hence, the ZC signal 74, indicating the zero count state of the system delay down counter 64, resets the station delay timer 58 and the system delay timer 56.

The station delay down counter 62 of each station 22 may be preloaded from one of two different switch sets 68, 70. A selector switch 80 is used to choose between a normal mode of operation and an emergency mode of operation. Ordinarily, each station 22 operates in the normal mode wherein the station delay down counter 62 is preloaded from a democratic switch set 68. When the emergency mode is selected, the station delay down counter 62 is preloaded from an autocratic switch set 70. The selector switch 80 is not to be limited to a manually-operated switch disclosed herein, but should be construed to include switching means actuated by any desirable means such as by hardware circuitry or digital computer means.

The bus access logic 46 also incorporates a blocking flip-flop 82 which is disclosed in the prior art. The blocking flip-flop 82, when active, allows each station 22 to transmit only once before every other station 22 in the network 20 is given an opportunity to transmit. Thus, the blocking flip-flop 82 prevents assertion of the BAGO signal 52 upon assertion of the transmit indicate (TI) signal 50. The blocking flip-flop 82 is reset, enabling assertion of the BAGO signal 52, upon assertion of the ZC signal 74, indicating expiration of the system delay down counter 64.

The improved bus access logic 46 includes logic to reset the blocking flip-flop 82 when the emergency mode of operation has been selected. This is accomplished by enabling a preload (PL) signal 86 through an AND gate 88 and an OR gate 90, to reset the blocking flip-flop 82. This action permits the station delay down-counter 62 to be preloaded from the autocratic switch set 70 at the onset of a transmission following selection of the emergency mode.

Figure 4:
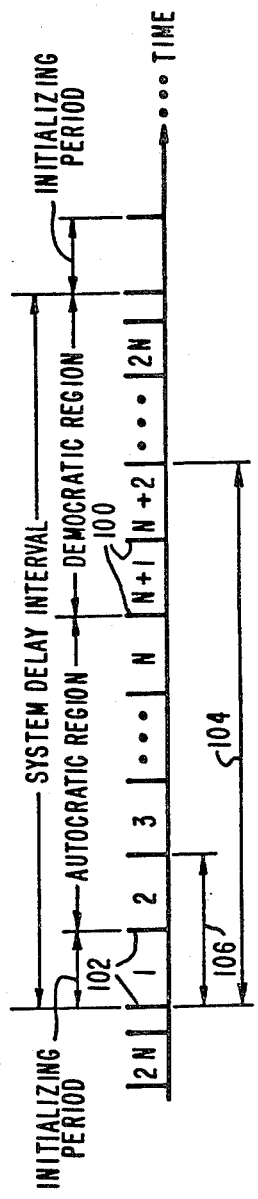
FIG. 4 is a graph depicting the relationship between democratic station delays and autocratic station delays of a single network.

FIG. 4 shows a diagram which demonstrates the relationship between democratic station delays 100 and autocratic station delays 102. Each station 22 in the network 20 is assigned a unique democratic station delay 100 as well as a unique autocratic station delay 102. All stations 22 ordinarily operate in the normal mode, using their democratic station delay 100. In this mode, the blocking flip-flop 82 prevents any single station 22 from transmitting more than once until every other station 22 is given an opportunity to transmit. When immediate access to the serial bus 24 is necessary so as to transmit an emergency message, the emergency mode of operation is selected and the station's autocratic station delay 102 is loaded into the station delay down counter 62. This permits the station 22 operating in the emergency mode to preempt the democratic allocation of bus access and gain relatively quick access to the serial bus 24. After transmission of the emergency message, the station 22 returns to the normal mode of operation.

FIG. 4 also shows a comparison between the magnitude 104 of the democratic station delay 100 for a station 22 and the magnitude 106 of the autocratic station delay 102 for a station 22.

Hence, this invention provides an arrangement whereby any one of a plurality of stations which communicate among one another on a single serial bus may obtain relatively rapid access to the serial bus for transmission of an emergency message thereon. This improvement retains the prior art advantage of orderly and collision-free access in the normal mode of operation.

What is claimed is:

1. In a digital communication system, a serial data communications network comprising:
   a plurality of stations,
   a serial data communications bus to which each of said stations is interfaced and through which each of said stations communicates to every other of said stations, and
   a plurality of circuit means, each in communication with one of said stations, for controlling orderly and collision-free access by said station to said serial bus and each operative in a selected one of the modes including a normal transmission mode and an emergency transmission mode, each circuit means comprising:
   first means for monitoring said bus for transmission inactivity over a preassigned first time period which is substantially common to all of the stations of said plurality, said first means including means for reinitializing its monitoring time upon detection of bus transmission activity within said first time period and for repeating monitoring of said bus over another first time period upon detection of transmission inactivity throughout a first time period, said first means further including means for generating a first signal upon initiation of each repeat of a monitoring operation,
   second means for monitoring said bus for transmission inactivity over a selected one of preassigned second and third time periods, each circuit means corresponding to a station of said plurality being preassigned a unique set of second and third time periods, all said preassigned second time periods being shorter in time than the shortest of said preassigned third time periods, said preassigned first time period being longer in time than the longest of said preassigned third time periods, said second means including means for reinitializing its monitoring time upon detection of bus transmission activity within said selected time period and for generating a second signal upon detection of transmission inactivity throughout said selected time period, said second means further including means for repeating monitoring said bus over another selected time period concurrent with said repeat of monitoring operation of said first means;
   means for selecting one of said preassigned second and third time periods corresponding to the desired transmission mode of said normal and emergency transmission modes of said corresponding station, respectively;
   means governed by said second signal to conditionally generate a third signal to permit said corresponding station exclusive transmission access to said bus, whereby collision-free access by each corresponding station to said bus is achieved;
   means for enabling said generating means to generate said third signal in accordance with a function based on a combination of time period selection and bus transmission activity, and a first signal generation; and
   means for disabling said generating means to prevent generation of said third signal upon transmission activity of said corresponding station and for maintaining disablement thereof after said transmission until enabled by said enabling means, whereby an orderly and emergency access by each corresponding station to said bus is achieved.

2. The network in accordance with claim 1 wherein each first means includes:
   a clocking source having a frequency substantially common to all of the stations of the plurality;
   a first counter governed by said clocking source for counting, upon activation, through the preassigned first time period from an initial state, said first counter capable of being reset to said initial state, at times, during said counting period thereof and operative to generate the first signal upon completion of counting through the first time period; and
   means for resetting said first counter to said initial state upon an event of the events including the detection of bus transmission activity and the generation of the first signal, and for activating said first counter upon detection of bus transmission inactivity;
and wherein each second means includes:
   a second counter governed by said clocking source for counting, upon activation by said activating means of said first counter, through the selected one of the preassigned second and third time periods from an initial state, said second counter capable of being reset by said resetting means of said first counter to said initial state, at times, during said selected counting period thereof and operative to generate the second signal upon completion of counting through the selected time period.

3. The network in accordance with claim 1 wherein said generating means includes a digital gate governed by a gating signal and the second signal to effect the third signal wherein the second signal is generated and the gating signal is in an enabling state, and to prevent the third signal generation when the second signal is generated and the gating signal is in a disabling state; and wherein the enabling and disabling means, in combination, include:
   a circuit for generating one signal when the second time period is selected and bus transmission activity is detected; and
   a flip-flop circuit responsive logically to either said one signal or the first signal to set said gating signal in its enabling state and responsive to transmission activity of the corresponding station to set said gating signal in its disabling state.

* * * * *